United States Patent [19]
Dragoo

[11] 4,079,203
[45] Mar. 14, 1978

[54] METHOD AND APPARATUS FOR TRANSMITTING AUXILIARY CHANNEL OVER DIGITAL COMMUNICATIONS SYSTEM

[75] Inventor: Robert E. Dragoo, Tolono, Ill.

[73] Assignee: The United States of America as represented by the Secretary of the Army, Washington, D.C.

[21] Appl. No.: 782,870

[22] Filed: Mar. 30, 1977

[51] Int. Cl.² ............................ H04J 1/10; H04J 9/00
[52] U.S. Cl. .......................... 179/15 BM; 179/15 BD; 179/15 BY
[58] Field of Search ........ 179/15 BM, 15 BY, 15 AF, 179/15 BD; 329/122; 331/10; 332/19

[56] References Cited
U.S. PATENT DOCUMENTS

| | | | |
|---|---|---|---|
| 3,093,815 | 6/1963 | Karnaugh | 179/15 AF X |
| 3,553,367 | 1/1971 | Krauss | 179/15 BM X |
| 3,569,631 | 3/1971 | Johannes | 179/15 AF |
| 3,579,281 | 5/1971 | Kam | 331/10 X |

*Primary Examiner*—David L. Stewart
*Attorney, Agent, or Firm*—Nathan Edelberg; Jeremiah G. Murray; Bernard Franz

[57] ABSTRACT

An auxiliary channel, for example, an engineering orderwire, is derived on an existing time-division multiplex carrier system by modulating the pulse repetition rate of the digital bitstream. The modulating signal itself may be an analog or a digital signal. The modulator and demodulator both include a first-in, first-out shift register acting as a buffer, and the desired modulation is effected by varying the rate at which the digital information is fed out of the FIFO buffer at the transmitting end of the carrier system.

11 Claims, 4 Drawing Figures

MODULATOR

DEMODULATOR

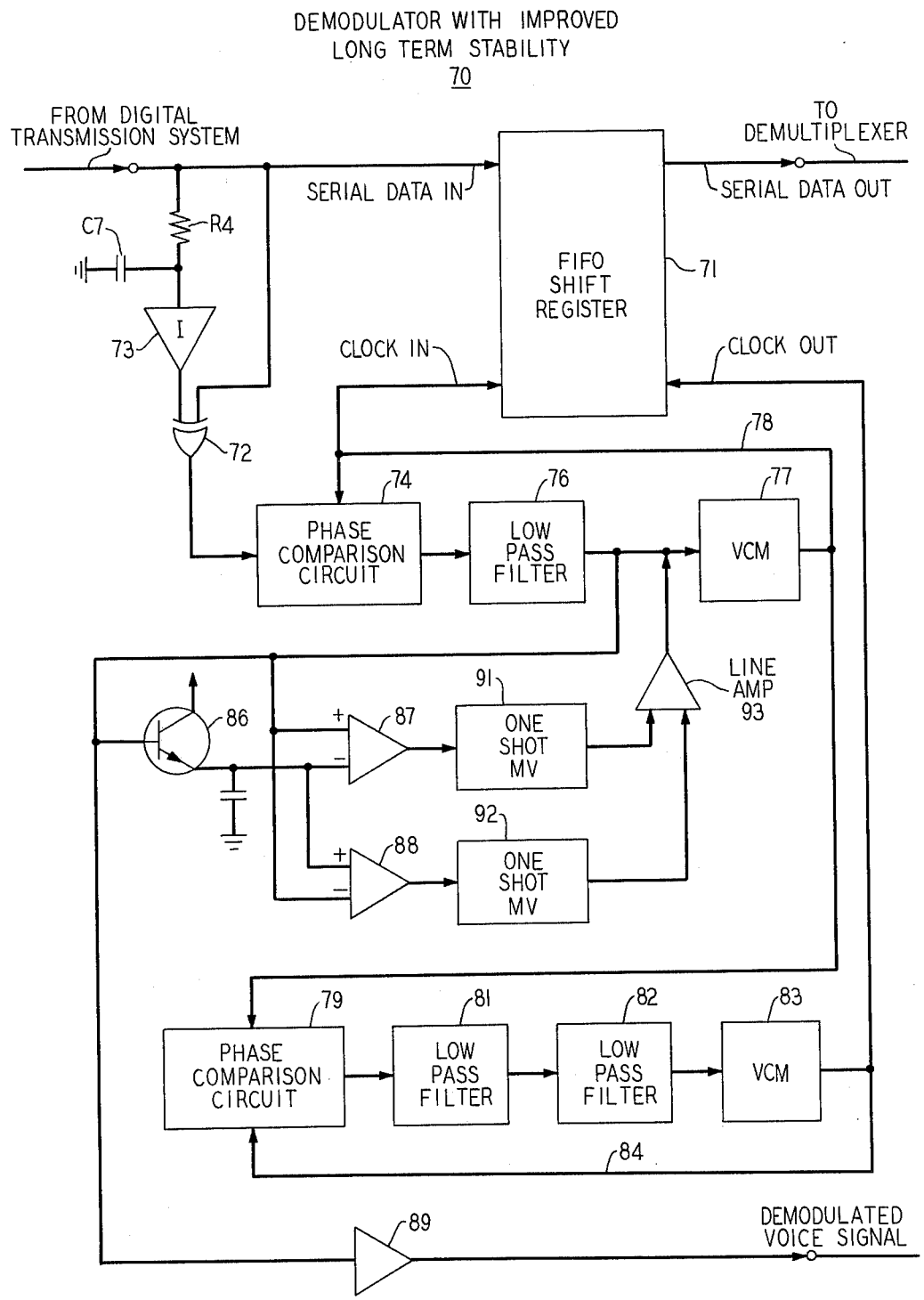

METHOD AND APPARATUS FOR TRANSMITTING AUXILIARY CHANNEL OVER DIGITAL COMMUNICATIONS SYSTEM

GOVERNMENT LICENSE

The invention described herein may be manufactured and used by or for the Government for governmental purposes without the payment of any royalties thereon or therefor.

BACKGROUND OF THE INVENTION (a) Field of the Invention

Broadly speaking, this invention relates to telecommunications. More particularly, in a preferred embodiment, this invention relates to methods and apparatus for providing engineering orderwire channels over telecommunications systems employing time-division multiplexing.

(b) Discussion of the Prior Art

As is well known, it is customary to provide at least one engineering orderwire for each multiplex telecommunications system that is placed into service. The orderwire is used by maintenance personnel located at intermediate repeater stations along the route and at both terminal locations to coordinate routine maintenance and trouble-shooting on the associated carrier system.

Ideally, the orderwire is completely divorced from the carrier system and follows a different physical route. Thus, in the event of a total system failure, the orderwire will remain functional, which greatly facilitates restoration of the failed carrier system.

Unfortunately, the provision of an independent, separately-routed orderwire is expensive to implement and in many situation, such as those where the carrier system is to be used in a tactical military environment, is impossible to achieve. Accordingly, the orderwire must somehow be routed along the same path that the carrier system follows. Of course, the orderwire may itself comprise one of the multiplexed channels in the carrier system but, if the multiplexing equipment should fail, then the orderwire will also fail, making system restoration most difficult.

On the other hand, if the carrier system is an analog system operating over metallic conductors or coaxial cable, the orderwire may be transmitted at baseband, completely bypassing the multiplexing equipment which considerably reduces the chance of simultaneous failure. Thus, unless the cable itself fails, the orderwire will always be available to coordinate restoration of the basic system.

A problem arises, however, when the carrier system is digital rather than analog. While, in theory, the orderwire can still be transmitted as a baseband signal, the large number of digital repeaters and their transmission characteristics makes this most impractical to implement. Further, if the digital signal is transmitted over an optical fiber, rather than a metallic conductor, practical difficulties arise in modulating the optical source in both analog (baseband) and digital (pulse data stream) modes.

SUMMARY OF THE INVENTION

As a solution to the above and other problems, I propose a technique whereby the orderwire is obtained by frequency or phase-modulating the multiplexed PCM data stream. It should be stressed that the term frequency modulation is not used here in its usual sense; rather, it is used to describe a modulation scheme wherein the pulse repetition rate is varied (i.e., modulated) about the mean repetition rate. Of course, implementation of such a modulation scheme must not disrupt the normal digital traffic on the system and must be easily accessible at each repeater station, if desired. As will be explained, the modulating signal may be an analog voice signal or a digitized PCM signal and, of course, need not be an actual orderwire but could be used, for example, to squeeze one more channel into an overcrowded 24-channel PCM system.

The invention and its mode of operation will be more fully understood from the following detailed description, when taken with the appended drawings, in which:

DESCRIPTION OF THE DRAWING

FIG. 4 is a block schematic diagram of an alternative embodiment of the demodulator shown in FIG. 2 including means for improving the long term stability of the system.

DETAILED DESCRIPTION OF THE INVENTION

Figure 1:
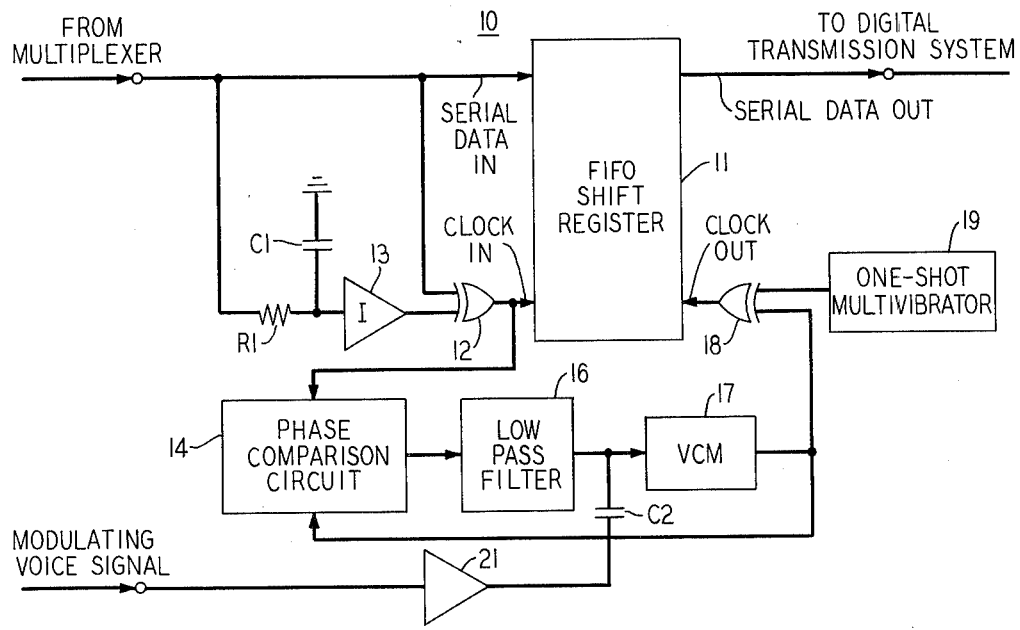
FIG. 1 is a block schematic diagram of an illustrative modulator according to the invention.
Figure 2:
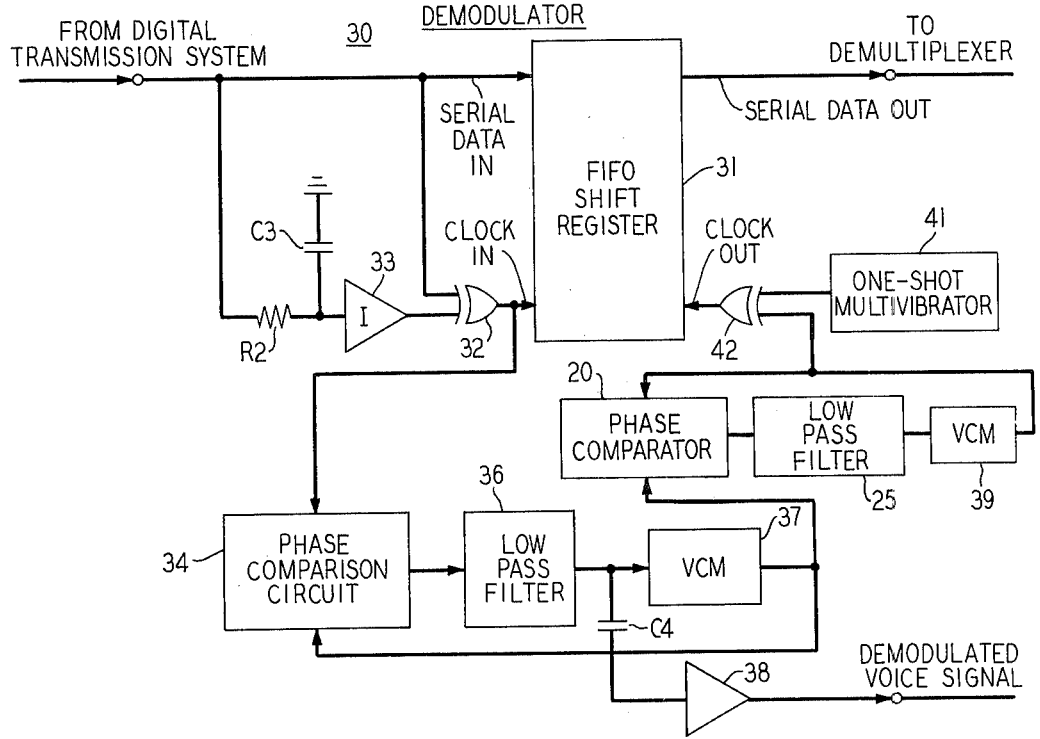
FIG. 2 is a block schematic diagram of an illustrative demodulator according to the drawing.

FIGS. 1 and 2 respectively depict the block circuit diagram of an illustrative pulse frequency modulator and demodulator according to the invention. As shown, modulator 10 comprises a first-in, first-out (FIFO) shift register 11, the input of which is connected to a source of an incoming digital bitstream, for example, the output of some suitable digital multiplexer. This digital bitstream must be coded such that there is at least one transition per bit frame (or interval). In like manner, the output of shift register 11 is connected to some suitable data sink, for example, the input of a digital transmission system (e.g., an optical source driver).

The incoming bitstream is also applied to one input of an exclusive OR-gate 12 and, via an integrator $R_1C_1$ and an inverter 13, to the second input of OR-gate 12. The output of OR-gate 12 is applied to the input clock lead of shift register 11 and to one input of a phase-comparison circuit 14 in a phase-lock loop including a low-pass filter 16 and a voltage-controlled multivibrator (VCM) 17. The output of VCM 17 is applied to the second input of phase-comparison circuit 14, via the feedback loop of the phase-lock circuit, and also to one input of a second exclusive OR-gate 18. The second input to OR-gate 18 comprises the output of a one-shot multivibrator 19. The modulating signal, which may illustratively comprise either an analog voice signal of from 300 – 1700 Hz or a digital (PCM) voice signal at 16 or 32 kb/s, is connected to the input of an amplifier 21 thence, via a capacitor $C_2$, to the input of VCM 17.

In operation, the incoming bitstream is exclusively OR'd with the complement of the bitstream to derive a timing signal (normally termed "clock") which is then input to the FIFO shift register to clock the incoming data into the register. This clock signal is also used as an input to the phase-lock loop circuit which, in the absence of any output from amplifier 21, will lock onto the timing signal. The output of VCM 17 is then exclusively OR'd with the output of an initialization circuit comprising one-shot multivibrator 19 and is then used as a clock signal to clock-out the data stored in FIFO shift register 11. The initialization circuit is required because at start-up register 11 is empty and must be partially filled for proper operation of the circuit.

The amplified modulating signal from amplifier 21 varies the output frequency of VCM 17 allowing the pulse stream output from the VCM to vary as the modulating signal. The "carrier" frequency, or the repetition rate, will vary as the modulating signal. Since the VCM output frequency will vary proportionally to the modulating input signal, the data which is clocked out of shift register 11 will be clocked out at a rate which is proportional to the modulating signal. The phase-lock loop 15 will then track the modulating signal, providing the bandwidth of the low-pass filter 16 is not exceeded. In other words, the incoming digital bitstream has been frequency or phase-modulated with the modulating signal. This type of modulation might also be considered a special form of pulse-position modulation.

The $\beta$ of this phase-modulation, that is the ratio of the deviation of the "carrier" to the bandwidth of the modulating signal, is dependent upon the driving limits of the VCM. It should be noted that in this scheme the phase shift may exceed $2\pi$ radians, that is, more than the width of one data pulse.

FIG. 2 depicts the demodulator 30 which, it will be observed, bears a striking similarity to the configuration of modulator 10. As shown, demodulator 30 comprises a FIFO shift register 31 which receives at its input the modulated bitstream from modulator 10, for example, after transmission over some suitable digital transmission system. The output of shift register 31 is connected to some suitable data sink, for example, the digital demultiplexer which in the absence of demodulator 31 would normally be connected to the output of the digital transmission system.

The incoming bitstream is also applied to one input of an exclusive OR-gate 32 and, via an integrator $R_2C_3$ and an inverter 33, to the second input of OR-gate 32. The output of OR-gate 32 is applied to the clock-in lead of shift register 31 and also to one input of a phase-comparison circuit 34 in a phase-lock loop including a low-pass filter 36 and a VCM 37. The output of VCM 37 is applied to the second input of phase-comparison circuit 34, via the feedback loop of the phase-lock circuit. The output of low-pass filter 36 is applied, via a capacitor C4, to an amplifier 38, the output of which comprises the demodulated analog or PCM encoded voice signal originally input to modulator 10 (FIG. 1). A second phase-lock loop comprising a phase comparator 20, a low-pass filter 25 and a voltage-controlled multivibrator 39, and a one-shot multivibrator 41 are respectively connected to the inputs of a second exclusive OR-gate 42, the output of which is connected to the clock-out lead of shift register 31.

In operation, the incoming bitstream is exclusively OR'd with the complement of the bitstream to derive a timing signal which is then input to the FIFO shift register to clock the incoming data into the register. This timing signal is also used as an input to the phase-lock loop which, thus, tracks the variation in the timing signal. This variation is, of course, the phase-modulation that was applied to the timing signal at the modulator. The demodulated signal is obtained at the output of the low-pass filter and amplified in amplifier 38 for use as required. The data stored in shift register 31 is output by means of the clock signal generated by the voltage-controlled oscillator 39. The one-shot multivibrator is used as an initialization circuit to provide for an initial partial filling of the register on start-up, as was done in the modulator, FIG. 1.

As previously mentioned, the modulation applied at the modulator may be either an analog voice signal of say from 300 – 1700 Hz or a digital (PCM) signal at 16 or 32 kb/s. In either case, the configuration of demodulator 30 remains the same; however, for an analog signal the cutoff frequency of the low-pass filter should be about 2 KHz and 32 kb/s for a 32 kb/s PCM signal.

While the above-described modulator and demodulator are satisfactory for many applications, a problem may arise with the long-term stability of the data stream timing. More specifically, if a difference occurs in the basic data timing between the two end terminals of the data transmission system, an overflow or underflow condition will eventually occur in the FIFO shift registers leading to data errors.

The stability requirement for the timing in a typical digital multiplexer is maintenance of framing for at least 500 milliseconds in the absence of any signal input. This requirement may also be applied to the FIFO shift registers used in the instant invention if either a bit-averaging technique or some other long-term tracking of the basic timing is effectuated.

The solution I have chosen to this problem is to continuously monitor the "fill percentage" of the FIFO register, that is to say, to determine how many data bits are actually in the register at any given instant compared to the maximum storage capacity of the register, or the minimum storage capacity of the register (some number approaching zero, but not actually zero). The information obtained by this monitoring procedure can then be used to maintain the percentage of fill between predetermined limits by manipulation of the timing for the actual data stream. Slowing down, the bitstream is accomplished by a "put-off" procedure and speeding up the bitstream is accomplished by a "burst" technique. The timing for this latter technique will exceed the cut-off frequency of the low-pass filter in the demodulator. Of course, a slowing of the timing for the transmitted data stream which falls without the bandpass of the filter used in the demodulator would permit a filling of the FIFO registers at both the transmitting and receiving ends of the data transmission system. Thus, the continual monitoring of the percentage fill at the transmitting end of the system permits a reduction in the size of the FIFO registers in both the modulator and demodulator. It is not necessary to monitor the percentage fill at the demodulator since the FIFO register in the demodulator "tracks" the register in the modulator. The only instance in which this would not be the case would be in the event of digital transmission failure.

Figure 3:
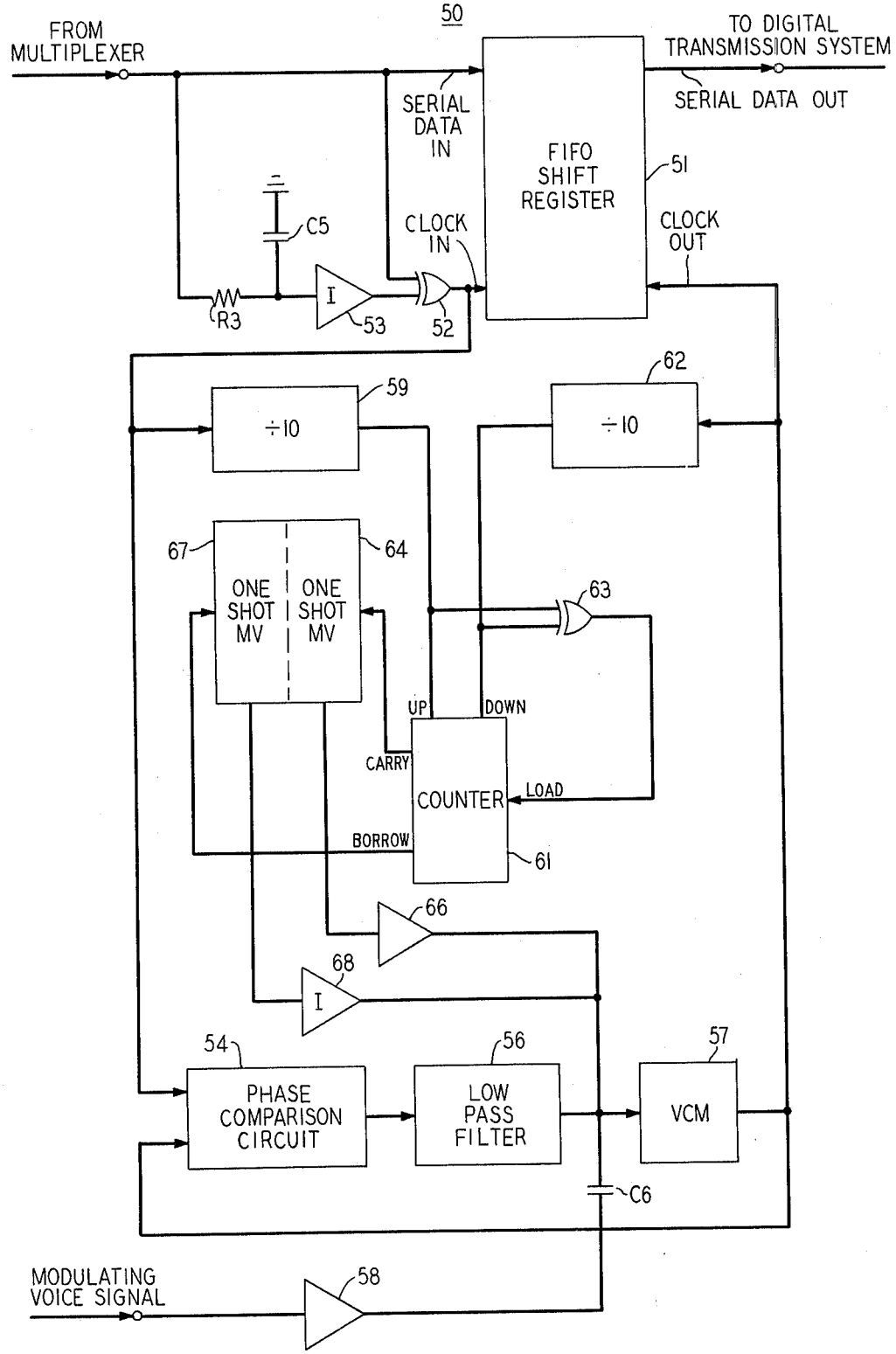
FIG. 3 is a block schematic diagram of an alternative embodiment of the modulator shown in FIG. 1 including means for monitoring the percentage fill of the FIFO shift register.

FIG. 3 depicts an illustrative modulator incorporating the above-described features. As shown, the modulator 50 comprises a FIFO shift register 51 having its input connected to the source of the incoming bitstream and its output connected to a data sink. As with the modulator shown in FIG. 1, the incoming bitstream is also applied to one input of an exclusive OR-gate 52 and, via an integrator $R_3C_5$ and an inverter 53, to the other input of OR-gate 52. The output of OR-gate 52 is applied to the input clock lead of FIFO register 51 and also to one input of a phase-comparison circuit 54 which forms a part of a phase-lock loop circuit including a low-pass filter 56 and a VCM 57. The output of VCM 57 is applied to the other input of phase-comparison circuit 54, via the feedback loop of the phase-lock circuit, and also to the clock-out lead of shift register 51. The modulating voice signal is applied to the input of VCM 57 via an amplifier 58 and a capacitor $C_6$. The output of OR-gate 52 is applied to the input of a divide-by-10 counter 59, the output of which is applied to the count-up control lead of a synchronous decade up/down counter 61. In like fashion, the output of VCM 57 is also applied to the input of a second divide-by-10 counter 62, the output of which is connected to the count-down lead of counter 61. The outputs of counters 59 and 62 are also connected to the input of a second exclusive OR-gate 63, the output of which is connected to the load input lead of counter 61. The carry output of counter 61 is connected to the input of a first one-shot multivibrator 64, the output of which is applied to the input of VCM 57, via a buffer amplifier 66. In like fashion, the borrow output of counter 61 is connected to the input of a second one-shot multivibrator 67, the output of which is also connected to the input of VCM 57, via an inverter 68.

In operation, modulator 50 behaves exactly as does the previously described modulator 10 except that in modulator 50 the input clock signals to shift register 51 are used to "count-up" counter 61 while at same time the output clock signals to shift register 51, i.e. the output from VCM 57, are used to "count-down" counter 61. For example, assume that FIFO register 51 is a 256-bit shift register which is initially half filled, that is to say, the first data bit will be placed in address 129. To limit shift register 51 to excursions from fill points of 28 bits to 228 bits (approximately 10% fill to 90% fill), the input and output clock signals of register 51 are divided by 10 in counters 59 and 62, respectively, and fed to the inputs of the synchronous decade counter 61. Thus, any time that the input clock signal gets 100 bits ahead of the output clock signal, a "carry" bit will be generated by counter 61. This "carry" bit will trigger one-shot multivibrator 64, the output of which is connected to VCM 57. This will cause VCM 57 to momentarily increase the clock rate of the read-out of register 51 and a "burst" of data will be transmitted to the other end of the transmission system, thus reducing the "percentage fill" of shift register 51 to some value intermediate 10% and 90%.

On the other hand, if the output clock signal gets ahead of the input clock signal by 100 bits, counter 61 will generate a "borrow" bit which in turn will trigger one-shot MV 67. Due to the inversion of inverter 68, the output of one-shot MV 67 will cause the clock rate output from VCM 57 to drop; thus, the data will be read out from register 51 at a slower rate until the input clock "catches-up" with the output clock. The function of OR-gate 63 is to inhibit counter 61 any time that there are coincident counts from counters 59 and 62. This is done because the logic of counter 61 requires the "count-up" input to be high when the "count-down" input is activated. The decade dividers 59 and 62, in conjunction with the decade counter 61, ensure that a bit count of 100 is the maximum possible excursion from the 50% fill point of register 51.

In the above-described circuit, the "push-up" or "draw-down" voltage supplied by counter 61, via the level-shifting amplifiers 66 and 68, respectively, drives the output of VCM 57 either up or down in frequency. If the VCM output is sufficiently far off the center frequency, then the frequency characteristics of the low-pass filter in the demodulator will not permit the phase-lock loop to track the frequency excursions of the VCM at the transmitter. Then, if the VCM in the demodulator can be forced into a free-running mode whenever a predetermined frequency deviation is exceeded, the desired bit averaging process will be accomplished. Unfortunately, this will not solve the timing stability problem posed by certain data transmission systems requirements; that is, maintenance of framing for 0.5 seconds in the absence of any signal input as caused, for example, by some momentary "hit" or fade on the digital transmission system.

Since in the above-described modulator the "push-up" or "draw-down" voltage is supplied by a one-shot multivibrator, a definite time interval can be established to govern the period of timing during which the frequency of the VCM is off the nominal center frequency. If a similar scheme were implemented in the demodulator, the timing stability of the receiver would be substantially improved. This would, of course, modify the tracking by the demodulator of the signal generated by the modulator. Further, by using a time-averaged transmission rate rather than an instantaneous transmission rate, the timing stability could be further improved.

FIG. 4 depicts an illustrative embodiment of a demodulator to effectuate the above objectives. As shown, demodulator 70 comprises a FIFO shift register 71 having its output connected to a data sink, e.g., the demultiplexer for the digital transmission system. The incoming bitstream is applied to one input of an exclusive OR-gate 72 and, via an integrator $R_4C_7$ and an inverter 73, to the other input of OR-gate 72. The output of OR-gate 72 is connected to one input of a first phase-comparison circuit 74 in a phase-lock loop circuit including a first low-pass filter 76 and a first VCM 77. The output of VCM 77 is fed to the other input of phase-comparison circuit 74 via a first feedback loop 78 which is connected to the clock-in lead of register 71. The output of VCM 77 also connects to one input of a second phase-comparison circuit 79 in a phase-lock loop circuit including second and third low-pass filters 81 and 82 and a second VCM 83. The output of VCM 83 is applied to the second input of phase-comparison circuit 79, via a second feedback loop 84, and also to the clock-out lead of shift register 71.

The output of low-pass filter 76 is applied to the gate of an IGFET transistor 86, to the non-inverting input of a first voltage comparator 87, to the inverting input of a second voltage comparator 88 and to an amplifier 89, the output of which comprises the demodulated audio signal. The source electrode of FET transistor 86 is connected to a capacitor 91 and to the inverting and non-inverting inputs, respectively, of voltage comparators 87 and 88. The output of comparator 87 is applied to a first one-shot multivibrator 91 while the output of comparator 88 is applied to the input of a second one-shot multivibrator 92. The outputs of multivibrators 91 and 92 are connected to the input of a line amplfier 93, the output of which is applied to the input of VCM 77. The line amplifier 93 is a "three-state" device.

In operation, the input clock signal for FIFO shift register 71 is obtained from the incoming bitstream by means of exclusive OR-gate 72, et cetera, in precisely the same manner shown in FIG. 2 for the demodulator 30 except that here the clock signal is obtained from the output of the phase-lock loop rather than the input. As before, the demodulated voice signal, which may be either analog or PCM-encoded digital, is obtained from the output of the low-pass filter 76, via amplifier 89.

The clock-out signal is obtained from the output of the lower one of the two phase-lock loop circuits which, in turn, is driven by the output of the upper phase-lock loop circuit. It is this feature that ensures timing stability even in the absence (< 0.5 sec.) of a data input signal. The voltage comparators 87 and 88 are only energized when a specific voltage threshold is exceeded. This latter condition occurs whenever the frequency of the output signal from filter 76 is significantly shifted from the center frequency (by more than 5% of the carrier frequency, say).

When such a condition occurs, the corresponding one-shot fires and the line amplifier will force the output frequency of VCM 77 to change, in an offsetting manner, to prevent loss of data, as discussed with reference to FIG. 3. Line driver 93 must, of course, be a three-state device, normally biased to the high impedance, or "off-state," and capable of being driven either "up" or "down" depending upon which one-shot has been fired. The FET transistor 86 serves as a voltage inverter/amplifier and the decoupling capacitor $C_8$ should be a very low leakage capacitor. The input impedance of comparators 87 and 88 should be reasonably high in order to maintain $\gamma_{IN} C_8$ time constant which is compatible with the stability requirements of the data transmission system and to provide long term bit averaging of the data stream to regenerate a stable timing signal for the output clock.

Note that in the lower phase-lock loop circuit, two tanden-connected, low-pass filters are employed to achieve the desired frequency characteristic. However, the actual configuration depends upon the stability of the loop and the desired low cut-off frequency; thus, the number of filter sections may be more or less than the two shown. The objective is, of course, to have a fractional frequency loop cut-off frequency which will maximize the long term stability of VCM 83.

All of the above assumes that the orderwire signal has a long term zero average value, which will generally be true. In the unlikely event that the long term average value is not zero, known digital processing steps may be necessary to force the long term average value to zero.

To simplify the drawing, conventional circuit elements such as power supplies, et cetera, have been omitted. Further, one skilled in the art may make various changes and substitutions to the layout of parts shown without departing from the spirit and scope of the invention.

What is claimed is:

1. A method of adding at least one auxiliary channel to an n-channel, time-division-multiplex communication system, which comprises the steps of:
    buffering the digital bitstream to be transmitted over said communications system in a first-in, first-out shift register at a first bit rate;
    reading-out the digital information stored in said shift register by said buffering step at a second bit rate nominally equal to said first bit rate; and
    modulating said second bit rate with the auxiliary channel signal such that the position of the bits in said digital bitstream varies from the mean position in accordance with the information content of said auxiliary channel signal.

2. The method according to claim 1 comprising the further steps of:
    monitoring the clock signals respectively feeding said digital bitstream into and out of said shift register thereby to determine the percentage fill of the register; and
    respectively slowing-down or speeding-up said second clock rate as the percentage fill of said shift register exceeds a predetermined upper or lower fill limit.

3. A method of recovering at least one auxiliary channel from an n-channel, time-division-multiplex communication system, said at least one auxiliary channel having previously been modulated on the digital bitstream of said communication system by varying the position of the bits in said bitstream from the mean position thereof, in accordance with the information content of said auxiliary channel signal, said method comprising the steps of:
    deriving a clock signal from the incoming digital bitstream received over said communication system;
    buffering said incoming bitstream in a first-in, first-out shift register at a bit rate determined by said clock signal;
    reading-out the digital information stored in said shift register at a fixed bit rate which is equal to the nominal bit rate of said time-division-multiplex communication system; and
    applying said clock signal to a phase-lock loop circuit including a phase-comparison circuit,
    deriving an output signal from of said phase-comparison circuit comprising a signal which corresponds to the modulating signal previously applied at the transmitting end of said communication system as said phase-lock loop tracks the variations in the timing of the incoming bitstream.

4. The method according to claim 3 including the further steps of:
    monitoring said phase-lock loop circuit to detect excessive deviations in the frequency of the feedback signal thereon and, if any such excessive deviations are detected;
    forcing the output frequency of said phase-lock loop, in an offsetting manner, back towards the nominal output frequency whereby the data stored in said shift register is read-out therefrom at said nominal bit rate.

5. Apparatus for deriving at least one auxiliary channel on an n-channel, time-division-multiplex communication system, which comprises:
    a first-in, first-out shift register having an input connected to the source of the multiplexed digital bitstream to be transmitted and an output connected to the input of said communication system;
    means, connected to the source of said digital bitstream, for generating a clock signal to shift said bitstream into said shift register;
    a phase-lock loop circuit, including a voltage-controlled multivibrator, connected to said clock signal generating means for generating a clock signal to shift-out the digital data stored in said shift register; and
    means, connected to the input of said voltage-controlled multivibrator and to the source of the signal which comprises said auxiliary channel, for modulating the output frequency of said phase-lock loop with information from said auxiliary channel and hence the rate at which data is clocked-out of said shift register into said communication system.

6. The apparatus according to claim 5 further comprising:

means for monitoring the percentage of data fill in said shift register; and means, responsive to said monitoring means, for speeding-up or slowing-down the rate at which data is clocked-out of said shift register as said percentage fill respectively approaches a predetermined upper or lower limit.

7. The apparatus according to claim 6 wherein said monitoring means comprises:

a first divider circuit having an input connected to the output of said clock signal generating means;

a second divider circuit having an input connected to the output of said phase-lock loop circuit; and an up-down counter having an "up-count" input connected to the output of said first divider circuit, a "down-count" input connected to the output of said second divider circuit and "carry" and "borrow" outputs.

8. The apparatus according to claim 7 wherein said speeding-up or slowing-down means comprises:

a first one-shot multivibrator having its input connected to said "carry" output;

a second one-shot multivibrator having its input connected to said "borrow" output; and inverting and non-inverting buffer amplifiers respectively interconnecting the outputs of said second and first one-shot multivibrators and the input to said voltage-controlled multivibrator.

9. Apparatus for recovering at least one auxiliary channel from an n-channel, time-division-multiplex communication system, said at least one auxiliary channel having priority been modulated on the digital bitstream comprising said communication system by varying the position of the bits in said bitstream from the mean position thereof, in accordance with the information content of said auxiliary channel signal, which comprises:

a first-in, first-out shift register having an input connected to the output of said time-division communication system to thereby receive the incoming modulated bitstream and an output connected to some suitable data sink;

means, connected to the output of said communication system, for generating a clock signal to shift said bitstream into said shift register;

means for generating a stable clock signal to shift-out the data stored in said shift register at a rate equal to the nominal or average bit rate of said time-division-multiplex communication system;

a first phase-lock loop circuit, including a voltage-controlled multivibrator, connected to the output of said clock signal generating means; and means, connected to the input of said voltage-controlled multivibrator, for deriving an output signal corresponding to the auxiliary channel information employed to modulate the data bitstream at the transmitting location as said phase-lock loop tracks the modulation impressed on said clock signal.

10. The apparatus according to claim 9 wherein said stable clock signal generating means comprises a second phase-lock loop circuit having an input connected to the output of said first phase-lock loop circuit; and said apparatus further comprises:

means, responsive to excessive deviations in the output frequency of said first phase-lock loop circuit, for forcing the output of said voltage-controlled multivibrator, in an offsetting manner, back towards the nominal operating frequency.

11. The apparatus according to claim 10 wherein said forcing means comprises:

an FET amplifier having its gate connected to the input to said voltage-controlled multivibrator;

first and second oppositely poled differential amplifiers having their inverting and non-inverting inputs respectively connected to the gate and to the source of said FET amplifier;

first and second one-shot multivibrators having their inputs respectively connected to the outputs of said first and second differential amplifiers; and a three-state line driver amplifier, normally biased to the high impedance state, having first and second inputs respectively connected to the outputs of said first and second one-shot multivibrators.

* * * * *